United States Patent Office 3,449,912
Patented June 17, 1969

3,449,912
HYDROSTATIC TRANSMISSION
Jerzy A. Habdank-Dunikowski, Birmingham, Mich., assignor to Sperry Rand Corporation, Troy, Mich., a corporation of Delaware
Filed Mar. 8, 1967, Ser. No. 621,515
Int. Cl. F16d 31/02; G05d 7/00; F16k 31/36
U.S. Cl. 60—53
20 Claims

ABSTRACT OF THE DISCLOSURE

A hydrostatic transmission having a hydraulic motor and a reversible hydraulic pump connected in a circuit by two conduits either of which may be a high pressure conduit and the other a low pressure conduit. A pressure surge control valve responsive to a predetermined pressure differential is by automatic means connected to whichever is the high pressure conduit. A conventional type relief valve limits or controls the highest system operating pressure, and is by the same automatic means connected to which ever is the high pressure conduit. The pressure surge control valve has a valve member with opposed pressure operating surfaces connected by means of a passage with a restriction therein and is responsive to a predetermined pressure differential in said passage ahead of and beyond said restriction for opening the valve and alleviating sudden pressure surges.

Background of invention

This invention relates to power transmissions and is particularly applicable to those of the type comprising two or more fluid pressure energy translating devices, one of which may function as a pump and the other as a fluid motor, such as a hydrostatic transmission for land vehicles.

Hydrostatic transmissions are particularly suitable for use with relatively small land vehicles including but not limited to tractors and lift trucks. The present invention contemplates the use of a hydrostatic transmission for use in propelling such vehicles and operating powered accessories. The starting, acceleration, deceleration, and stopping of the vehicle is achieved by varying the displacement of the pump within the transmission in one or both directions from the neutral or zero displacement position. During these modes of operation, pressure surges may be developed which impose heavy shock loads upon the pump, motor, and other components within the transmission. Generally, most vehicles of the type incorporating such a transmission contemplate use by a riding operator. Such sudden pressure surges interrupt smooth motion of the vehicle and often result in a jerk of the vehicle tending to throw the operator off balance or even off the vehicle, causing possible injury.

Summary

The invention comprises a hydrostatic transmission of a fluid motor energized by a fluid pump connected in a circuit incorporating a control valve having opposed operating surfaces responsive to a predetermined pressure differential for alleviating pressure surges in either direction of motor operation.

It is an object of the present invention to provide a hydrostatic transmission system which achieves high operational efficiencies by utilizing a varable displacement pump, a motor powered thereby, and a pressure surge control valve in conjunction therewith responsive to a predetermined pressure differential for alleviating sudden pressure surges and the undesireable effects as herebefore mentioned.

It is also an object of the invention to provide a reversible transmission with a single pressure surge control valve, of the type described for limiting pressure surges in either direction of operation, automatically, without incorporating a plurality of pressure surge control valves.

It is another object of the invention to provide in a transmission as previously recited, a main system relief valve and means which automatically connect both the surge control valve and the system relief valve to whichever is the high pressure conduit of the transmission.

Still a further object of this invention is to provide an improved low cost hydrostatic transmission which utilizes standard hydraulic pump and motor components so as to provide a system which is precisely controlled, rugged, compact and easy to maintain and assemble and disassemble.

Another object is to provide an improved pressure surge control valve which is so designed to open in response to a predetermined pressure differential across opposing pressure operating surfaces of the valve. Thus the valve operation is determined by the differential across the valve operating surfaces, and no pressure limits are placed upon the system as occurs in the case of a conventional pressure relief valve.

Still a further objective of this invention is to provide an improved low cost pressure surge control valve which is easy to maintain and assemble and disassemble.

Further objectives and advantages of the invention will be apparent from the following description, reference being made to the accompanying drawings, wherein a preferred form of the invention is clearly shown.

In the drawings

Figure 1:
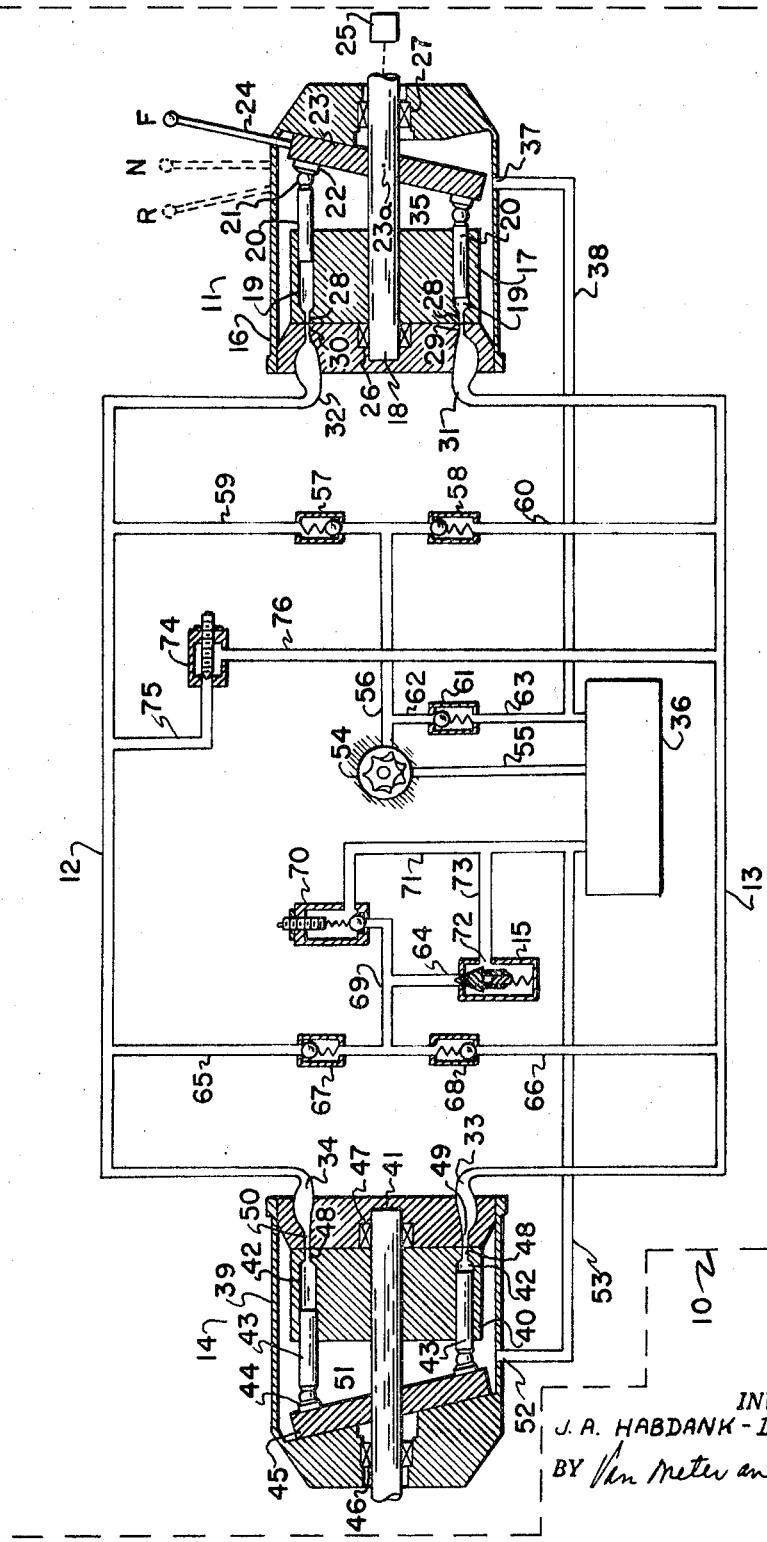
FIGURE 1 is a diagrammatic illustration of a hydrostatic transmission embodying a preferred form of the invention.
Figure 2:
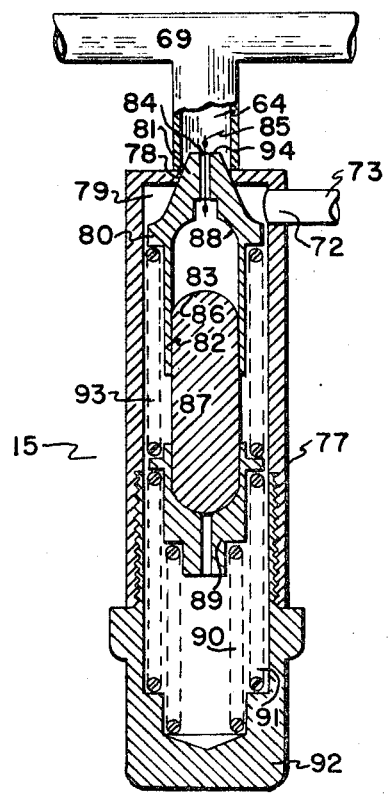
FIGURE 2 is a sectional view of the pressure surge control valve in a seated position.

Referring to the drawings, there is shown in FIG. 1 a hydrostatic transmission indicated generally by the numeral 10, which includes a reversible, variable displacement pump 11 connected in a closed circuit by conduits 12 and 13 to a fluid motor 14. Incorporated in said circuit is a pressure surge control valve 15, a preferred form of which is shown in FIG. 2, connected in a manner therein to automatically connect the same to and relieve pressure surges from whichever is the high pressure conduit of the closed circuit.

The pump 11 is of the well known axial piston type comprising a housing 16 having a cylinder barrel 17 rotatably mounted therein suitably connected with an input shaft 18. The cylinder barrel 17 is formed with a plurality of axial cylinder bores each housing a piston reciprocable therein, only two of the bores and pistons being shown respectively indicated by the numerals 19 and 20. Each piston 20 has a spherical outer end portion 21 positioned respectively in bearing shoe 22, engaging swashplate 23, which is manually operable in opposite directions about pivot 23a from a neutral zero displacement position by means of a handle 24. A prime mover 25 schematically illustrated is mechanically connected through suitable means to the input shaft 18 which is supported within the pump housing 16 by bearing means 26 and 27.

As is conventional in pumps of the type illustrated, each cylinder bore in the cylinder barrel 17 is provided with a cylinder port 28, two of which are shown. The cylinder ports 28 are adapted to alternately register with ports 29 and 30 as the cylinder barrel revolves, one of which is an outlet port and the other an inlet port, depending upon which side of neutral the swashplate 23 is located. The ports 29 and 30 respectively communicate with external ports 31 and 32. Ports 31 and 32 are connected in closed circuit by conduits 12 and 13 to external ports 33 and 34 of the fluid motor 14.

The cylinder barrel 17, pistons 20, swashplate 23 and input shaft 18 are immersed in a fluid filled cavity referred to as the pump case 35. The pump case 35 communicates with reservoir 36 by means of passage 37 and conduit 38.

The motor 14 is also of the axial piston type, but of the fixed displacement type, comprising a housing 39 having a cylinder barrel 40 rotatably mounted therein, suitably connected with output shaft 41. The cylinder barrel 40 is formed with a plurality of axial cylinder bores, each having a piston reciprocable therein, only two of the bores and pistons being shown and respectively indicated by the numerals 42 and 43. Similar to the pistons in pump 11, each motor piston has a bearing shoe 44, engaging a swashplate 45, but the swashplate 45 remains fixed at a predetermined angle from neutral position. The output shaft 41 is suitably supported by bearing means 46 and 47.

Similar to pump 11 the motor cylinder barrel 40 contains a plurality of cylinder ports 48, two of which are shown, which are adapted to alternately register with ports 49 and 50 as the cylinder barrel revolves. The ports 49 and 50 communciate with external ports 33 and 34. Motor case 51 communicates with reservoir 36 for the purpose of drainage by means of passage 52 and conduit 53.

It will be understood that when the handle 24 of pump 11 is in the far right position (F) in which it is illustrated, pump output will be a maximum in one direction. As the handle 24 is rotated toward the neutral position (N), output will diminish to zero in said neutral position. Upon crossing the neutral position, pump output will reverse and increase to a maximum in that direction as handle 24 reaches the far left position (R).

The transmission is provided with a positive displacement gear type replenishing pump 54 which is also driven by the prime mover 25. The replenishing pump is in communication with a reservoir through a supply conduit 55 for supplying replenishing fluid to the system by means of a delivery conduit 56. Spring biased check valves 57 and 58 are provided and are in communication with the delivery conduit 56 and with closed circuit conduits 12 and 13 respectively by means of conduits 59 and 60 respectively, for supplying replenishing fluid to whichever is the low pressure side of the closed hydraulic circuit through one of the check valves while pressure in the high pressure side of the circuit maintains the other check valve closed. A spring biased relief valve 61 is provided for the replenishing ciricut which relieves excessive presure fluid from replenishing pump 54 to reservoir 36 by means of conduits 62 and 63.

For the purpose of connecting whichever is the high pressure conduit of the closed circuit to an inlet 64 of pressure surge control valve 15, closed circuit conduits 12 and 13 are respectively connected by conduits 65 and 66 to a conduit 69 connected to said surge control inlet 64. The conduits 65 and 66 having check valves 67 and and 68 incorporated therein opening to the conduit 69. Fluid is conducted from the high pressure side of the closed hydraulic circuit through one of the check valves to conduit 69 while the other check valve prevents high pressure fluid from being admitted from conduit 69 to the low pressure line of the closed hydraulic circuit.

In order to prevent over pressurization of the hydraulic circuit, an inlet of a high pressure system relief valve 70 also is connected to conduit 69 and, at a predetermined pressure, say 3000 p.s.i., will exhaust excessive pressure fluid into reservoir 36 by means of a conduit 71. Conduit 71 is also connected to an outlet 72 of the pressure surge control valve by means of conduit 73. It should thus be noted that the same means, i.e. check valves 67 and 68 in conduits 65 and 66 which are connected to conduit 69, automatically connect whichever is the high pressure conduit of the closed circuit to the inlets of the pressure surge control valve 15 and relief valve 70. It should be noted that although relief valve 70 is diagrammatically represented as an adjustable spring biased relief valve, any suitable conventional relief valve may be used.

In order to facilitate movement of the vehicle by manual means when desired, a system by-pass valve, or the like, may be provided as at 74 for connecting conduits 12 and 13 by means of conduits 75 and 76.

Referring now to FIG. 2, the pressure surge control valve 15 comprises a housing 77, the outlet 72 of which communicates with conduit 73 and the inlet 64 of which communicates with high pressure conduit 69 at one end and forms a valve seat 78 at the opposite end, which opens into a cylindrical valve chamber 79 which communicates with outlet 72. For controlling the opening of valve seat 78, a movable valve member 80 is provided. This member preferably has a conically shaped nose 81, engaging the valve seat 78 and having a hollow body portion 82 extending therefrom, of generally cylindrical shape. Within the hollow portion of the body, is a pressure chamber 83, which communicates with inlet 64 by means of a restricted passage 84 formed in the conical nose 81. Pin 85, slidable within the restricted passage 84, extends slightly into the inlet at one end and slightly into the pressure chamber at the opposite end, thus providing a self-cleaning means for the restricted passage. Pressure chamber 83 is formed by the side walls of body 82, an end surface 86 of piston 87 and an operating surface 88 of conical nose portion 81. The end surface 86 constitutes a shiftable wall member of pressure chamber 83 and is in opposing relation to operating surface 88.

Piston 87 is slidable within the hollow section of body 82 forming a substantially fluid tight seal between the same and the side walls of body 82 and the end thereof opposite to surface 86 is received by a piston seat 89. The piston 87 and piston seat 89 are normally urged toward valve seat 78 by compression springs 90 and 91 which are disposed between piston 89 and a plug member 92 which is threaded onto housing 77. Urging valve member 80 toward valve seat 78, is a relatively light spring 93 disposed between valve member 80 and piston seat 89.

During steady state operation of the transmission the inlet 64 and pressure chamber 83 will be subject to the same steady state pressure due to the communication through the restricted passage 84. Conical nose portion 81 provides a pressure effective operating surface 94 equal in area to that of seat 78 exposed to the inlet pressure and opposed to operating surface 88 in chamber 83. The pressure effective area of surface 88 being greater than that of surface 94, the resultant hydraulic force will normally seat conical valve member 80 against valve seat 78. In a steady state condition, the force acting against surface area 86 of the piston 87 will be opposed by an equal force exerted by compression springs 90 and 91, thereby determining some intermediate position of piston 87 as illustrated in FIG. 2.

When the pump displacement is rapidly changed to accelerate, in either direction of operation, the pump for an instant delivers more fluid than the motor can receive. If the excess flow is not removed, pressure surges will occur which are transmitted throughout the entire hydraulic circuit. As the pressure rises in the inlet 64, there will be a corresponding rise in the pressure chamber 83. As the pressure in chamber 83 increases, the piston 87 will move away from valve seat 78. Due to the restricted passage 84, the rate of flow of the fluid into the chamber 83 will be low enough to delay a simultaneous pressure build-up in chamber 83, thus causing a pressure differential between the inlet and the pressure chamber 83. When a predetermined pressure differential between the inlet and the pressure chamber is reached, valve member 80 will be unseated from valve seat 78, thus allowing fluid to escape from the high pressure conduit and drain into outlet 72. Due to the differential pressure between the inlet and the pressure chamber, fluid will continue to flow through the restricted passage 84 subsequent to the valve member unseating. As the pressure in chamber 83 continues to increase, valve member 80 will move towards valve seat 78. When the pressure differential between inlet 64 and chamber 83 drops below a predetermined value, valve member 80 will close off communication between inlet 64 and outlet 72.

It will be understood that the pressure surge control valve differs from ordinary relief valves in that it does not open at a predetermined maximum pressure but becomes operative when a predetermined pressure differential exists, irrespective of the absolute pressures in the inlet and the pressure chamber. For example, a pressure surge control valve designed to open at a 200 p.s.i. differential will be unseated when the pressure in the inlet 64 is 500 p.s.i. and the pressure in the pressure chamber 83 is 300 p.s.i., although the valve member will not unseat with 3000 p.s.i. in the inlet 64 and 2900 p.s.i. in the pressure chamber 83.

It will be noted that the transmission as described above requires only one pressure surge control valve for controlling both forward and reverse motion of the vehicle.

While the form of embodiment of the invention as herein disclosed constitutes a preferred form, it is to be understood that other forms might be adopted, all coming within the scope of the claims which follow.

What is claimed is as follows:

1. A pressure surge control valve comprising:
   (A) a housing having an inlet connected to an outlet;
   (B) a valve member having opposed pressure operating surfaces and normally closing communication between the inlet and the outlet;
   (C) means forming a chamber having a resiliently biased shiftable wall member responsive to pressure increases in said chamber to expand said chamber, said shiftable wall member being in substantially fluid tight relationship with said chamber during said chamber expansion; and,
   (D) a pressure sensing passage connected to said inlet and to said chamber, including a restriction therein, said valve member being responsive to a predetermined pressure differential in said passage, ahead of and beyond said restriction for opening the inlet to the outlet.

2. A combination as in claim 1, wherein said shiftable wall member is in opposing relation to one of said valve member pressure operating surfaces.

3. A combination, as in claim 1, wherein one of said pressure operating surfaces is connected and responsive to pressure at the inlet ahead of said restriction, and the other of said pressure operating surfaces is exposed and responsive to pressure within said chamber beyond said restriction.

4. A combination, as in claim 1, wherein said restriction is formed in a portion of the pressure sensing passage which extends through said valve member to the chamber.

5. A combination, as in claim 3, wherein said restriction is formed in a portion of the pressure sensing passage which extends through said valve member to the chamber.

6. A combination, as in claim 3, wherein the area of the valve member operating surface in the chamber is greater than the area of the valve member operating surface connected to the inlet.

7. A combination, as in claim 6, wherein said restriction is formed in a portion of the pressure sensing passage which extends through said valve member to the chamber.

8. A combination, as in claim 1, wherein said resiliently biased wall member comprises a spring biased piston, one end of said piston being slidably disposed within a hollow portion of said valve member.

9. A combination, as in claim 6, wherein said resiliently biased wall member comprises a spring biased piston, one end of said piston being slidably disposed within a hollow portion of said valve member.

10. A combination, as in claim 9, wherein said restriction is formed in a portion of the pressure sensing passage which extends through said valve member to the chamber.

11. A hydrostatic transmission comprising:
   (A) a hydraulic motor unit and a hydraulic pump unit connected thereto in a closed circuit including a high pressure conduit so that the pump delivers fluid to drive the motor; and
   (B) a pressure surge control valve comprising:
      (1) a housing with an outlet and an inlet, said inlet being connected to the high pressure conduit;
      (2) a valve member having opposed pressure operating surfaces and normally closing communication between the inlet and the outlet;
      (3) means forming a chamber having a resiliently biased, shiftable wall member responsive to pressure increases in said chamber to expand said chamber, said shiftable wall member being in substantially fluid tight relation with said chamber during said chamber expansion; and
      (4) a pressure sensing passage connected to said inlet and to said chamber including a restriction therein, said valve member being responsive to a predetermined pressure differential in said passage ahead of and beyond said restriction and opening the inlet to said outlet to alleviate pressure surges in the high pressure conduit.

12. A hydrostatic transmission comprising:
   (A) a hydraulic motor unit connected to a hydraulic pump unit including means for reversing said motor, and also including two flow conduits associated with said motor, either of which is a high pressure conduit, and the other a low pressure conduit, depending upon the directional operation of the motor.
   (B) a pressure surge control valve comprising:
      (1) a housing having an inlet and an outlet,
      (2) a valve member having opposed operating surfaces and normally closing communication between the inlet and the outlet,
      (3) means forming a chamber having a resiliently biased shiftable wall, said chamber being expansible in response to increases in pressure therein; and,
      (4) a pressure sensing passage connected to said inlet and to said chamber including a restriction therein, said valve member being responsive to a predetermined pressure differential in said passage ahead of and beyond said restriction and opening the inlet to the outlet to alleviate pressure surges; and,
   (C) means for automatically connecting said inlet to whichever is the high pressure conduit.

13. A combination, as in claim 12 wherein the two flow conduits connect the motor unit to the pump unit in a closed circuit and one of the said units is of the variable displacement type including control means operable in opposite directions from a neutral position for varying and reversing the displacement of the said unit and thus controlling the speed and directional operation of the motor unit.

14. A combination as in claim 12, wherein a system relief valve is provided having an inlet and an outlet and is responsive to a predetermined maximum system pressure for connecting the inlet to the outlet, and wherein the same means automatically connecting the inlet of the pressure surge control valve to whichever is the high pressure conduit also performs the function of connecting the inlet of the system relief valve to whichever is the high pressure conduit.

15. A combination, as in claim 13, wherein a system relief valve is provided having an inlet and an outlet and is responsive to a predetermined maximum system pressure for connecting the inlet to the outlet, and wherein the same means automatically connecting the inlet of the pressure surge control valve to whichever is the high pressure conduit also performs the function of connecting the inlet of the system relief valve to whichever is the high pressure conduit.

16. A combination as in claim 12 wherein said shiftable wall member is in a substantially fluid tight relationship to said chamber during said chamber expansion.

17. A combination as in claim 16 wherein said resiliently biased wall member comprises a spring biased piston, one end of said piston being slidably disposed within a hollow portion of said valve member.

18. A combination as in claim 11 wherein said resiliently biased wall member comprises a spring biased piston, one end of said piston being slidably disposed with a hollow portion of said valve member.

19. A combination as in claim 1 wherein said resiliently biased wall member is disposed within a hollow portion of said valve member.

20. A combination as in claim 2 wherein said valve member pressure operating surfaces and said shiftable wall member are in axial alignment within a bore formed within said housing.

References Cited
UNITED STATES PATENTS

| | | | |
|---|---|---|---|
| 2,043,953 | 6/1936 | Vickers | 60—52 XR |
| 2,267,177 | 12/1941 | Twyman | 91—402 XR |
| 2,737,196 | 3/1956 | Eames | 137—108 XR |
| 2,859,762 | 11/1958 | Banker | 137—108 XR |
| 3,243,959 | 4/1966 | Fantom. | |

EDGAR W. GEOGHEGAN, *Primary Examiner*.

U.S. Cl. X.R.

137—108, 494